June 30, 1964 J. C. CRAWFORD, JR., ET AL 3,139,253
INSULATED HOSE CLAMPS

Filed Nov. 12, 1958 2 Sheets-Sheet 1

INVENTORS
JAMES C. CRAWFORD, JR.
RALF L. HARTWELL
BY
John A. McKinney
ATTORNEY

June 30, 1964  J. C. CRAWFORD, JR., ETAL  3,139,253
INSULATED HOSE CLAMPS
Filed Nov. 12, 1958  2 Sheets-Sheet 2
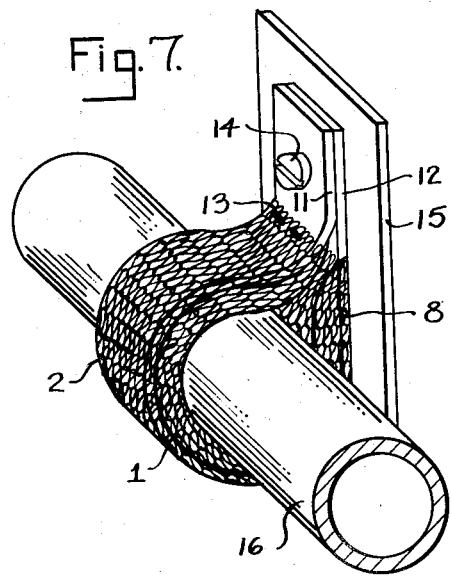
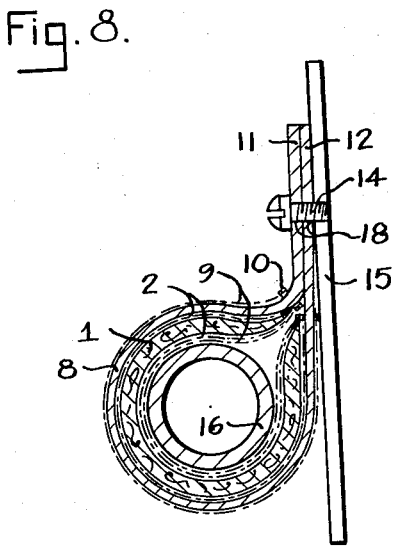
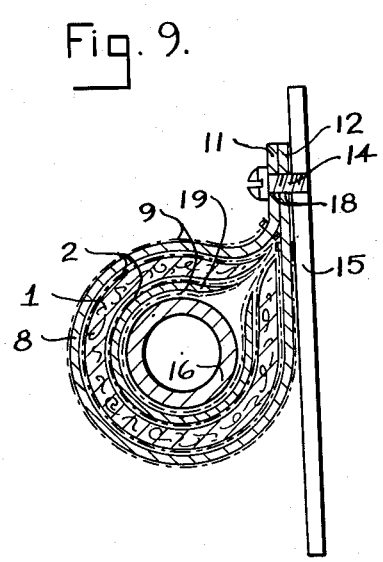
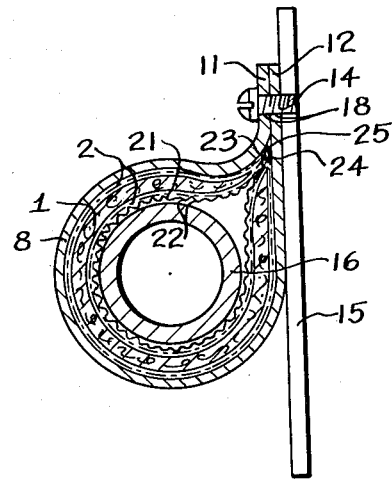
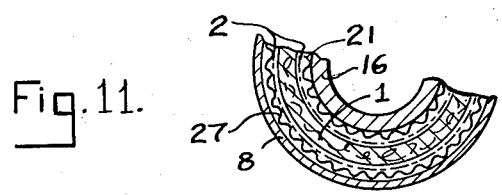
INVENTOR
JAMES C. CRAWFORD, JR
RALF L. HARTWELL
BY
John A. McKinney
ATTORNEY United States Patent Office 3,139,253
Patented June 30, 1964

3,139,253
INSULATED HOSE CLAMPS
James C. Crawford, Jr., White Plains, N.Y., and Ralf L. Hartwell, Cranford, N.J., assignors to Johns-Manville Corporation, New York, N.Y., a corporation of New York
Filed Nov. 12, 1958, Ser. No. 773,474
6 Claims. (Cl. 248—74)

This invention relates to a clamp for holding various types of conduits and to the method of making such a clamp. More specifically, the invention provides a metal clamp with a resilient cushion of insulating material secured thereto for holding conduits or ducts in areas of extremely high temperatures, approximately 2000° F., and subjected to excessive vibrations. Such clamps are particularly suited for installation in aircraft, space traveling vehicles or projectiles, and the like, but are also intended for use in any desirable surroundings.

The general form of metal clamp for these purposes comprises a metal band or strip formed into a loop. To allow for dimensional irregularities and for the dampening of vibrations, the metal band or strip is encompassed with a resilient cushion. However, for high temperature operations, in the neighborhood of 2000° F., most cushions are not satisfactory. When high temperatures are to be encountered, it has been proposed to use material having high insulating qualities such as a suitably sized braided asbestos. However, such material rapidly deteriorates under the combination of high temperature and excessive vibration and begins to lose its structural integrity and flake off. Also, in aircraft installations, whenever the cushioning material is non-conductive, it is necessary to provide a bonding strip that will cooperate with the metal band or strip to equalize the potential between the air frame and the conduit to prevent static discharges which interfere with radio transmission and reception.

It is an object of this invention to provide a clamp for holding conduits in which the clamp is resistant to excessive vibration and high temperature.

It is another object of this invention to provide a method for making a clamp for holding conduits in a desired position in which the clamp is provided with a heat-resistant cushion.

It is a further object of this invention to provide a clamp for holding conduits in a desired position wherein the clamp is provided with a means for holding a heat-resistant cushion in position on a metal strip and wherein said means also provides for equalizing the electric potential between the supporting structure and the conduit.

The foregoing objects are preferably accomplished in accordance with the instant invention by a metal clamp having a refractory fiber felt secured to the metal clamp so that the refractory fiber felt forms an insulating cushion on the inner surface of the clamp and is adapted to contact the conduit and to be held in position when the clamp is formed into a loop. In the preferred embodiment of the invention, the insulating cushion is designed to retain the integrity of the fibers in the insulating cushion and yet has sufficient flexibility so that the insulating cushion may readily conform to the inner contour of the loop forming the metal clamp. Furthermore, in the preferred embodiment, the insulating cushion encased in the flexible mesh envelope is secured to a pre-formed metal strip of the clamp by a second flexible mesh envelope that encases the pre-formed metal strip and the insulating cushion and is secured to the pre-formed metal strip by welding through an encircling retaining band. The second mesh envelope is preferably of heavier construction to protect the structure against abrasion and is also adaptable for bending within the radius of the metal strip without buckling. However, it is to be understood that the invention is not to be limited to the preferred embodiment or to the forms illustrated and described in the following specification.

The preferred method for making the preferred clamp of the instant invention is to insert an insulating cushion encased in a first flexible mesh envelope within a relatively large second mesh envelope which fits loosely around the first flexible mesh encased insulating cushion. The free end of a pre-formed metal strip is inserted between the second flexible mesh envelope and the first flexible mesh encased insulating cushion. Suitable tension is applied to the second envelope to stretch the second envelope along its longitudinal axis to a narrower width and a smaller stitch opening so that the second flexible mesh envelope snugly encases the metal strip and the flexible mesh enclosed insulating cushion. The second flexible mesh envelope is secured to the metal strip adjacent to but spaced from each end of the strip by resistance welding through an encircling retaining band and the remaining ends of the second flexible mesh envelope are severed for removal. In other forms of the instant invention, various appropriate methods are used for securing the flexible mesh enclosed insulating cushion to the metal strip which is pre-formed into a loop.

The invention will be more fully understood and further objects and advantages thereof will become apparent when reference is made to the following detailed description of various embodiments of the invention and the accompanying drawings in which:

FIG. 7 is a pictorial representation of a clamp made in accordance with the instant invention;

FIG. 8 is a view in cross-section showing the preferred embodiment of the clamp of the instant invention;

FIG. 9 is a view in cross-section of another type of clamp made in accordance with the instant invention;

FIG. 10 is a view in cross-section of another type of clamp made in accordance with the instant invention; and FIG. 11 is a view in cross-section of a part of another type of clamp made in accordance with the instant invention.

Figure 1:
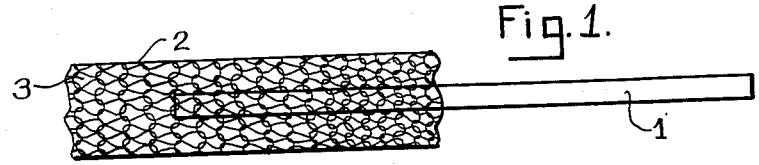
FIGS. 1 through 3 illustrate a method for enclosing an insulating cushion within a flexible mesh envelope.
Figure 2:
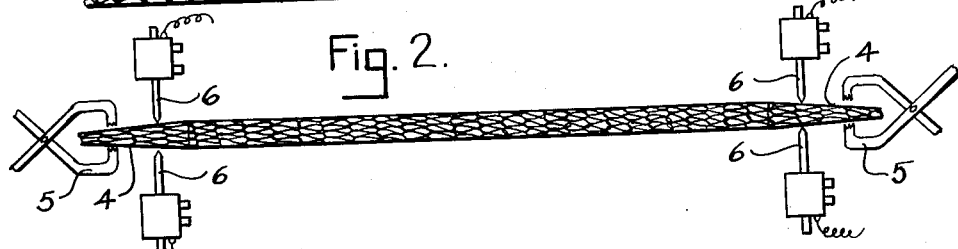
Figure 3:
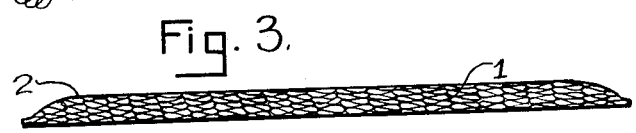

Referring to the drawings, there is illustrated in FIGS. 1-3 the method for encasing an insulating cushion 1 within a flexible metal mesh envelope 2. The insulating cushion 1 is placed within an open ended tubular metal mesh envelope 2 which, as illustrated in FIG. 1, is of sufficient tubular size in cross-section to receive loosely the insulating cushion 1. As shown in FIG. 1, the tubular mesh envelope 2 has a relatively open stitch 3. When the insulating cushion 1 is within the mesh envelope 2, a tension is applied to the ends 4 of the mesh envelope 2 by the jaws 5 so that the flexible mesh envelope 2 is stretched along its longitudinal axis. As the mesh envelope 2 is stretched, the lateral size or width of the stitch opening 3 decreases as a comparison of FIGS. 1 and 2 readily indicates. When the mesh envelope 2 has been stretched a distance, which may be predetermined, so that the mesh envelope is contiguous to the insulating cushion 1, the adjacent ends of the mesh envelope 2 are subjected to the resistance welding tips 6 and secured together to form a flexible mesh closure around the insulating cushion 1. In the product illustrated in FIG. 3, the insulating cushion 1 is a refractory fiber felt and is enclosed in a flexible knitted wire Inconel envelope. However, it is to be appreciated that the insulating cushion can be made of any desired insulating material, having similar physical characteristics, and the flexible mesh envelope could also be made of other suitable material.

Figure 4:
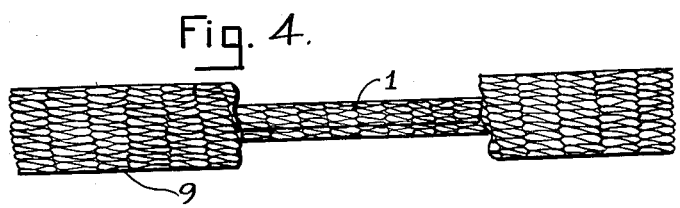
FIGS. 4 through 6 illustrate a method for securing a flexible mesh enclosed insulating cushion to a pre-formed metal strip.
Figure 5:
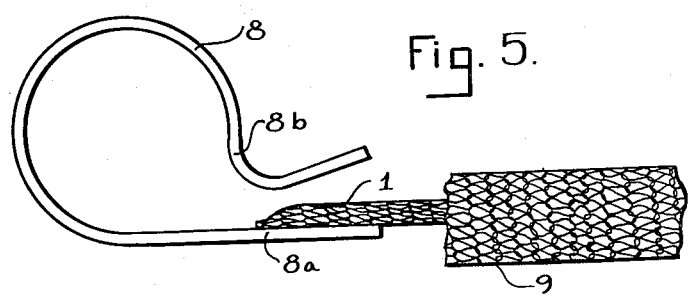
Figure 6:
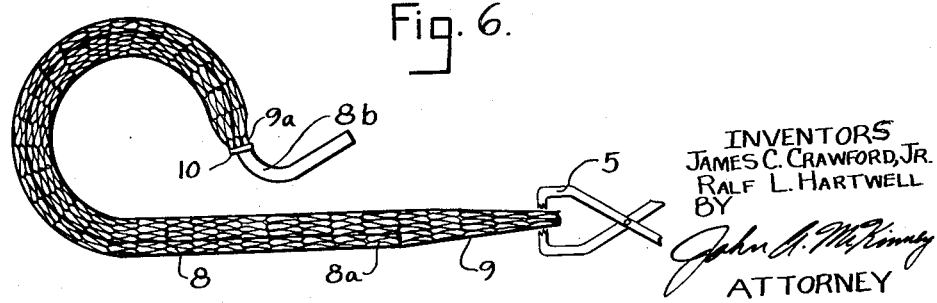

The method of securing a flexible mesh enclosed insulating cushion to a metal strip 8 which is pre-formed into a loop to form a clamp for holding a conduit in a desired location is illustrated in FIGS. 4–6.

An insulating cushion 1 enclosed in a flexible mesh envelope 2 is inserted within a second open ended tubular flexible mesh envelope 9 which loosely receives the flexible mesh encased insulating cushion 1, as illustrated in FIG. 4. The free end 8a of the pre-formed metal strip 8, as shown in FIG. 5, is inserted between the flexible mesh encased insulating cushion 1 and the second open ended, tubular, flexible mesh envelope 9 until the end 9a of the flexible mesh envelope 9 reaches the area 8b of the pre-formed strip 8. The end 9a is then secured to the pre-formed strip 8 by welding. Tension is then applied to the free end of the mesh envelope 9 by the jaws 5 so that the tubular mesh envelope 9 is stretched along its longitudinal axis. As the mesh envelope 9 is stretched, the lateral size or width of the stitch opening decreases as a comparison of FIGS. 5 and 6 readily indicates. The tubular mesh envelope 9 is stretched a distance, which may be predetermined, until it is in contiguous relationship with the metal strip 8 and the flexible mesh enclosed insulating cushion 1. The section of the mesh envelope 9 extending beyond the insulating cushion 1 is secured, as by welding, adjacent the end 8a of the pre-formed metal strip 8, and the remaining portion of the mesh envelope is severed. A metal band 10 encircles each end of the tubular mesh envelope 9 and is subjected to the resistance welding tips 6 to secure further the insulating cushion 1 in proper position on the metal strip 8.

In the form of the invention illustrated in FIG. 7, a metal strip 8 has been bent into substantially a loop with its end portions 11 and 12 in mating superposed relationship. An insulating cushion 1 is secured in position on the inner surface of the loop formed by the metal strip 8 by a flexible mesh envelope 2 which is secured to the metal strip 8 by welds 13. The flexible mesh envelope 2 is contiguous to the inner surface of the insulating cushion 1 and to the outer surface of the metal strip 8 and functions to retain snugly the insulating cushion in proper position on the metal strip 8. A bolt 14 passes through aligned openings in the ends 11 and 12 and is threadedly secured in the supporting structure 15. The clamp illustrated in FIG. 7 encircles the conduit 16 with the flexible mesh enclosed insulating cushion in contact therewith so that any vibrations of the conduits 16 are dampened thereby. The clamp thus functions to hold the conduit 16 in a desired position and to provide dampening action with high heat-resistant characteristics, as provided, for example, when a pad of felted refractory fiber is employed as the insulating cushion 1.

The preferred embodiment of the instant invention is illustrated in FIG. 8 which shows a clamp made in accordance with the method illustrated in FIGS. 4–6. An insulating cushion 1, as previously described, is enclosed in a flexible mesh envelope 2 and is placed in superposed relationship on a metal strip 8. The enclosed insulating cushion is secured in proper position on the inner surface of the loop formed by the metal strip 8 by another flexible mesh envelope 9 which is secured to the metal strip 8 by the metal bands 10 which are welded thereto. If desired the ends of the mesh envelope 9 may be secured to the metal strip 8 by welding before the bands 10 are applied. A bolt 14 passes through aligned openings 18 in the ends 11 and 12 and is threadedly secured in the supporting structure 15. The clamp illustrated in FIG. 8 encircles the conduit 16 with the flexible mesh enclosed insulating cushion in contact therewith so that any vibrations of the conduit 16 are dampened thereby. The clamp thus functions to hold the conduit 16 in a desired position and to provide dampening action with high heat-resistant characteristics.

In FIG. 9, there is illustrated a form of the instant invention similar to that of FIG. 8. To protect further the insulating cushion 1, a strip of thin heat-resistant foil 19 is inserted between the mesh envelopes 2 and 9. This foil 19 functions to serve as a solid barrier against any tendency of the insulating cushion to flake out due to vibration. If desired, the foil 19 could contain transverse corrugations, at right angles to the length thereof, and of a suitable depth and pitch to prevent buckling when formed into a loop. The remainder of the structure and its function is in accordance with that described in connection with the clamp of FIG. 8.

In the form of the invention illustrated in FIG. 10, an insulating cushion 1 enclosed in a flexible mesh envelope 2 is secured in position on the inner surface of the loop formed by the metal strip 8 by a flexible heat-resistant foil strip 21. The foil strip 21 has a plurality of transverse corrugations 22, at right angles to the length thereof, which are of suitable depth and pitch to prevent buckling when formed into the loop. The ends 23 and 24 of the foil strip 21 are secured to the metal strip 8 by welds 25. In operation, the conduit 16 is snugly received within the encircling foil strip 21 so that the insulating cushion will dampen any vibrations and is held in desired position by the bolt 14 passing through aligned openings 18 in the ends 11 and 12 in the metal strip 8 and threadedly received in the supporting structure 15. The foil strip 21 serves as a solid barrier against any tendency of the insulating cushion to flake out due to vibration. The foil might also be extended around the edges of the insulating cushion 1 enclosed by the mesh 2 to provide still more complete protection from hot and corrosive gases, provided the foil is sufficiently flexible or is rendered sufficiently flexible by crimping, corrugating, kerfing, and dimpling, etc., as not to interfere with the overall flexibility and the functioning of the insulating cushion.

The form of the invention illustrated in FIG. 11 is similar to that illustrated in FIG. 10. A second heat-resistant corrugated foil strip 27 is positioned between the flexible mesh enclosed insulating cushion 1 and the metal strip 8. The corrugated foil strip 27 functions to allow cooling air to pass between the insulating cushion 1 and the metal strip 8. The clamp, illustrated in FIG. 11, functions to hold a conduit 16 in a desired position as explained in connection with the other forms of the invention, particularly that illustrated in FIG. 10.

In the forms of the invention illustrated herein, the insulating cushion was formed from a refractory fiber felt ⅛″ in thickness, such as that marketed under the trademark Thermoflex RF–1200, and capable of withstanding temperatures to 2000° F. The tubular flexible mesh envelopes were made of knitted Inconel wire and had the characteristic of being readily adaptable to be stretched to a narrower width and a smaller stitch opening upon applying suitable tension along the longitudinal axis thereof. The heat-resistant foil strips disclosed herein were made from sheets of .004 Inconel metal cut to a predetermined length and then corrugated, in the forms of the invention in which corrugations were employed. The metal strips 8 forming the main body of the clamp were of standard design and shape, and adapted to withstand high temperatures in service. It is to be noted that the particulars given above are for illustration purposes only, and it is not intended to limit the invention thereto.

In operation, the instant invention provides a clamp for conduits in which the insulating cushion 1 functions as a resilient cushion capable of absorbing excessive vibration and at the same time possessing highly desirable high heat-resistant characteristics. The flexible mesh envelope retains the effective structural integrity of the insulating cushion and yet has sufficient flexibility to permit bending to conform to the desired contour of the clamp. In the preferred form of the invention, that illustrated in FIG. 8, the heavier outer mesh envelope serves to protect the structure against abrasion in addition to the other desired prevailing characteristics. The clamp provided by the instant invention cushions or dampens local vibrations without causing undue stresses in the supporting structure. Also, in the forms of the invention illustrated in the drawing, the clamp is provided with a metal surface in contact with the conduit so that it may serve as an electrical conductor, whether or not the insulating cushion itself will so function, for the purpose of equalizing the potential between the supporting structure and the conduit to prevent static discharges and in providing any other desired electrical property.

The insulated clamp of the instant invention possesses other highly desired characteristics. The insulating cushion of a refractory fiber felt is of itself heat-resistant and at the same time has a resilient nature to hold securely a conduit while dampening the excessive vibration thereof. The resiliency of the insulating cushion and the stretch of the flexible mesh envelope allows for the expansion of the conduit due to the heat of the surroundings. Thus, as the conduit expands to a greater diameter, the resiliency of the insulating cushion will absorb the expansion of the conduit without undue binding of the clamp on the conduit, such binding being undesirable as it tends to prevent the normal relative longitudinal movement between the clamp and the conduit which occurs upon expansion and contraction of the conduit.

Having thus described the invention in rather full detail, it will be understood that these details need not be strictly adhered to and that various changes and modifications may suggest themselves to one skilled in the art, all falling within the scope of the invention as defined by the subjoined claims.

What we claim is:

1. A clamp for use in supporting conduits comprising a strip adapted to be formed into a first loop, said first loop being formed with the ends of said strip in superposed relationship so that said first loop may be secured to a supporting structure, an insulating cushion comprising a material capable of withstanding temperatures in excess of 2000° F. but having characteristics of flaking off or otherwise disintegrating structurally when subjected to excessive vibrations at these temperatures, said insulating cushion being formed into a second loop, said second loop having a smaller radius of curvature than said first loop, said insulating cushion being heat-resistant and adapted to dampen vibrations, a first flexible mesh envelope encasing said insulating cushion, a second flexible mesh envelope encasing said strip and said insulating cushion encased in said flexible mesh envelope, said second flexible mesh envelope being adapted to retain said insulating cushion in position on said strip, means for securing said second flexible mesh envelope to said strip, and a flexible metallic strip, said flexible metallic strip being located between and contiguous to said first flexible mesh envelope and said second flexible mesh envelope, and said flexible metallic strip forming a solid protection barrier for said insulating cushion.

2. A clamp as in claim 1 wherein said insulating cushion comprises a refractory fiber felt.

3. A clamp for use in supporting conduits comprising a strip adapted to be formed into a first loop, said first loop being formed with the ends of said strip in superposed relationship so that said first loop may be secured to a supporting structure, an insulating cushion comprising a material capable of withstanding temperatures in excess of 2000° F. but having characteristics of flaking off or otherwise disintegrating structurally when subjected to excessive vibrations at these temperatures, said insulating cushion being formed into a second loop, said second loop having a smaller radius of curvature than said first loop, said insulating cushion being heat-resistant and adapted to dampen vibrations, a flexible mesh envelope encasing said insulating cushion, and a corrugated flexible foil strip, said foil strip being contiguous to said insulating cushion encased in said flexible mesh envelope, said foil strp beng formed into a third loop, said third loop having a smaller radius of curvature than said second loop, said foil strip being adapted to retain said insulating cushion in position on said loop forming strip, and providing a solid protective barrier for said insulating cushion, and means for securing said foil strip to said first loop forming strip.

4. A clamp as in claim 3 wherein said insulating cushion comprises a refractory fiber felt.

5. A clamp as in claim 3 and further including a second corrugated flexible foil strip, said second foil strip being positioned between said flexible mesh enclosed insulating cushion and said loop forming strip, said second foil strip allowing cooling air to pass between said insulating cushion and said loop forming strip.

6. A clamp as in claim 5 wherein said insulating cushion comprises a refractory fiber felt.

References Cited in the file of this patent

UNITED STATES PATENTS

| | | |
|---|---|---|
| 1,877,460 | Hocher | Sept. 12, 1932 |
| 2,330,602 | LeTourneau | Sept. 28, 1943 |
| 2,338,031 | Ellinwood | Dec. 28, 1943 |
| 2,416,063 | Nicholls | Feb. 18, 1947 |
| 2,689,105 | Zimmer | Sept. 14, 1954 |
| 2,709,558 | Young | May 31, 1955 |
| 2,790,614 | Miller | Apr. 30, 1957 |
| 2,923,760 | Famely | Feb. 2, 1960 |

FOREIGN PATENTS

| | | |
|---|---|---|
| 990,925 | France | June 13, 1951 |